Figure 1:
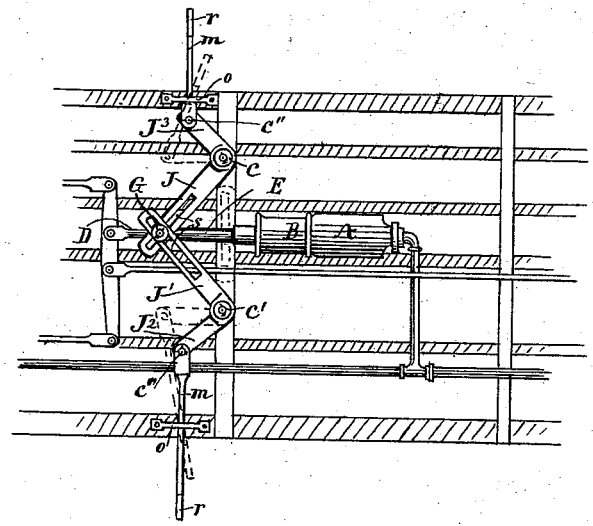

(No Model.)

E. V. MATTICE & J. E. DUNWELL.
BRAKE PISTON INDICATOR.

No. 506,787. Patented Oct. 17, 1893.

Witnesses:
Chas. E. Raabe
Chas Krenz

Inventors:
Ed V. Mattice,
John E. Dunwell,
by W. V. Tefft,
Attys.

UNITED STATES PATENT OFFICE.

EDWARD V. MATTICE AND JOHN E. DUNWELL, OF CHILLICOTHE, ILLINOIS.

BRAKE-PISTON INDICATOR.

SPECIFICATION forming part of Letters Patent No. 506,787, dated October 17, 1893.

Application filed December 3, 1892. Serial No. 453,935. (No model.)

*To all whom it may concern:*

Be it known that we, EDWARD V. MATTICE and JOHN E. DUNWELL, citizens of the United States, residing at Chillicothe, in the county of Peoria and State of Illinois, have invented certain new and useful Improvements in Brake-Piston Indicators; and we do hereby declare that the following is a full, clear, and exact description of the invention, which will enable others skilled in the art to which it appertains to make and use the same.

Our invention relates to certain new and useful improvements in brake piston indicators, by means of which a brake piston indicator is provided, simple in construction, durable, very efficient in operation for the purpose designed, and cheap in first cost.

More particularly our invention relates to a brake piston indicator operated in the operation of the air brake, to throw outward indicators in the form of wings or other suitable forms that may be seen at a distance, the said indicators being designed to be thrown outward a sufficient distance to carry them from a concealed position beneath the car to an exposed position beyond the sides of the said car.

Our invention consists essentially of two angle bars provided with long and short arms, set at right angles with each other and suitably pivoted upon a frame or cross piece, beneath the sills of the car, by a bolt or pin passing through a perforation provided in each of the respective angle bars at the central point of the respective angles the said bolts being provided with suitable washers and suitable keys, fitted in key-ways in the respective bolts or pins for security of attachment and ease of adjustment, the respective angle bars or the long arms thereof being suitably slotted as shown, and connected together for sliding adjustment by means of a suitable bolt or pin attached integrally to a sleeve upon a push bar brake or piston or a collar thereof upon its forward extremity and provided with suitable key-ways, key and washer attachment, for security of connection and to facilitate in ease of adjustment of the respective parts therewith connected, and our invention further consists of suitable rod or bar connections with the extremities of the respective short arms of the angle bars in a pivotal manner and the provision thereon of vertical wing attachments depending therefrom or in suitable manner attached thereto to act as indicators the said pivoted rods so attached to short arms of angle bars being suitably carried through the eyes of suitable lag-bolts or other means to give security of position and to facilitate the adjustment of the same and in further details of construction unnecessary to be particularly specified.

That our invention may be more fully understood, reference is had to the accompanying drawings in which—

Figure 2:
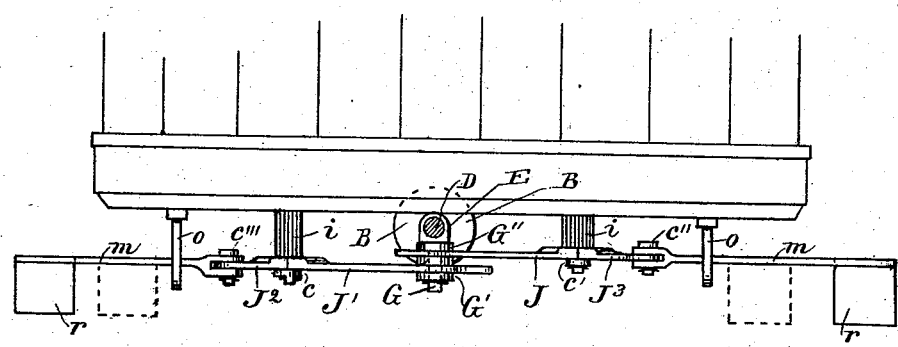

Figure 1 is a plan view, showing our improved brake piston indicator in connection with an air-brake. Fig. 2 shows it as viewed from the end of a car.

In the figures, A and B designate the respective parts of an air-brake, known as the reservoir and cylinder.

E is a sleeve and D the piston or push bar, bearing within the sleeve E and connected with the cylinder lever, as shown.

$J'$—$J^2$ and J—$J^3$ refer to angle bars and the respective letters to the respective arms thereof.

S designates slots in the respective long arms of the said angle bars.

G is a pin integrally connected with the sleeve E, and bearing within and through the slots in the respective angle bars or the long arms thereof and is provided with a washer attachment; $m$—$m$ are shift rods secured to the frame work of the bar in suitable manner; $i$—$i$ are blocks or frame pieces provided for bearings for the respective angle bars at their angle points and $c$—$c'$ designate washers provided for the purpose above specified, and $c''$—$c'''$ are pivotal bolts connecting the shift rods with the short arms of the respective angle bars.

In operation for the purpose designed, namely: for the purpose of brake piston indicator, the respective parts being first placed in the relative positions in full lines, any movement of the sleeve E either backward or forward will carry with it the integral pin attachment G, and in such backward and forward movement of the said pin, the respective arms J—J' will be moved backward or forward therewith, the said pin being carried backward or forward in the respective slots in the said angle bars, as the said bars accommodate themselves to the movement of the pin, thus causing an inward or outward movement of the respective short arms $J^2$—$J^3$ with relation to the car or the respective sides thereof, and a corresponding lateral movement of the shift rods $m$—$m$, with reference to the angle bar.

As shown in Fig. 1, in dotted lines, the long arms lie parallel with each other and directly over or under one another and the respective short arms and shift rods will be in the position shown in dotted lines with the wing attachment upon the shift rods drawn inwardly for the purpose of concealment beneath the body of the car, and when in the position shown in the solid lines as drawn outward by the forward movement of the sleeve and push bar or piston, it will be seen that the short arms of the respective angle bars are thrown outward, and carry with them the respective shift rods $m$—$m$, thus carrying outward the wing attachment $r$—$r$ from points beneath and at the respective sides of the car in plain view of persons upon a train made up of cars to which our improved signal might be attached; the two adjustments or relative positions of the respective wings $r$—$r$ upon the shift bars, may be best seen by reference to Fig. 2.

The particular advantage possessed by the attachment of our improved brake piston indicator in manner here shown may readily be seen when it is known that in the operation of air brakes it frequently occurs that from various causes they fail to perform their function in whole or in part. It is well known to be the experience of train men that in the use of said air brakes, in setting the same, and afterward releasing them, some particular brake or brakes may fail to be released thus retarding materially the progress of the train, causing an excessive waste of power, and it is further known that it is sometimes difficult or practically impossible to determine which brake or brakes of a series so fails to operate or release without very close inspection but by the means herein provided of the signal attachment it will readily be seen that when the brakes have been once set every indicator of the series will be exposed to plain view to any one upon the train who may look along either side thereof, and when the brakes have been released or the proper action taken from the engine to release same, any brake failing to be so released will plainly be designated by the continued exposed wings, thus discovering same to those upon the train that they may take proper action to release same by the usual methods employed for that purpose.

Having thus fully described our invention, what we claim, and desire to secure by Letters Patent, is—

1. The combination in a brake piston indicator of a sleeve mounted upon the piston rod and carrying a pin, an angle bar pivoted to the frame work of the car and engaged by the pin at one end and a rod having a wing attached thereto at one end pivoted at its other end to the angle bar, whereby when the brakes are off the wing will be withdrawn and when the brakes are applied the wing will be thrust out so as to be exposed to view.

2. The combination in a brake piston indicator of a sleeve mounted upon the piston rod and carrying a pin, the oppositely adjusted angle bars pivoted to the frame work of the car and engaged by the pin at one end and the oppositely adjusted rods each having a wing attached thereto at one end and pivoted at their other end to the short arms of the angle bars whereby when the brakes are off the wings will be withdrawn and when the brakes are applied the wings will be thrust out so as to be exposed to view.

3. In a brake piston indicator the combination with the piston rod of an angle bar pivoted to the frame work of the car and engaged by a pin suitably carried upon the piston rod and provided with a rod having a wing attached thereto pivoted to the short arm of the angle bar, all substantially as described and for the purpose set forth.

In testimony whereof we affix our signatures in presence of two witnesses.

ED. V. MATTICE.
JOHN E. DUNWELL.

Witnesses:
H. C. PETTETT,
CHAS. E. DOWNING.